Feb. 15, 1927.
A. J. HOLMAN
1,617,596
OPTICAL SYSTEM FOR MOVING PICTURE PROJECTORS
Filed Sept. 27, 1923
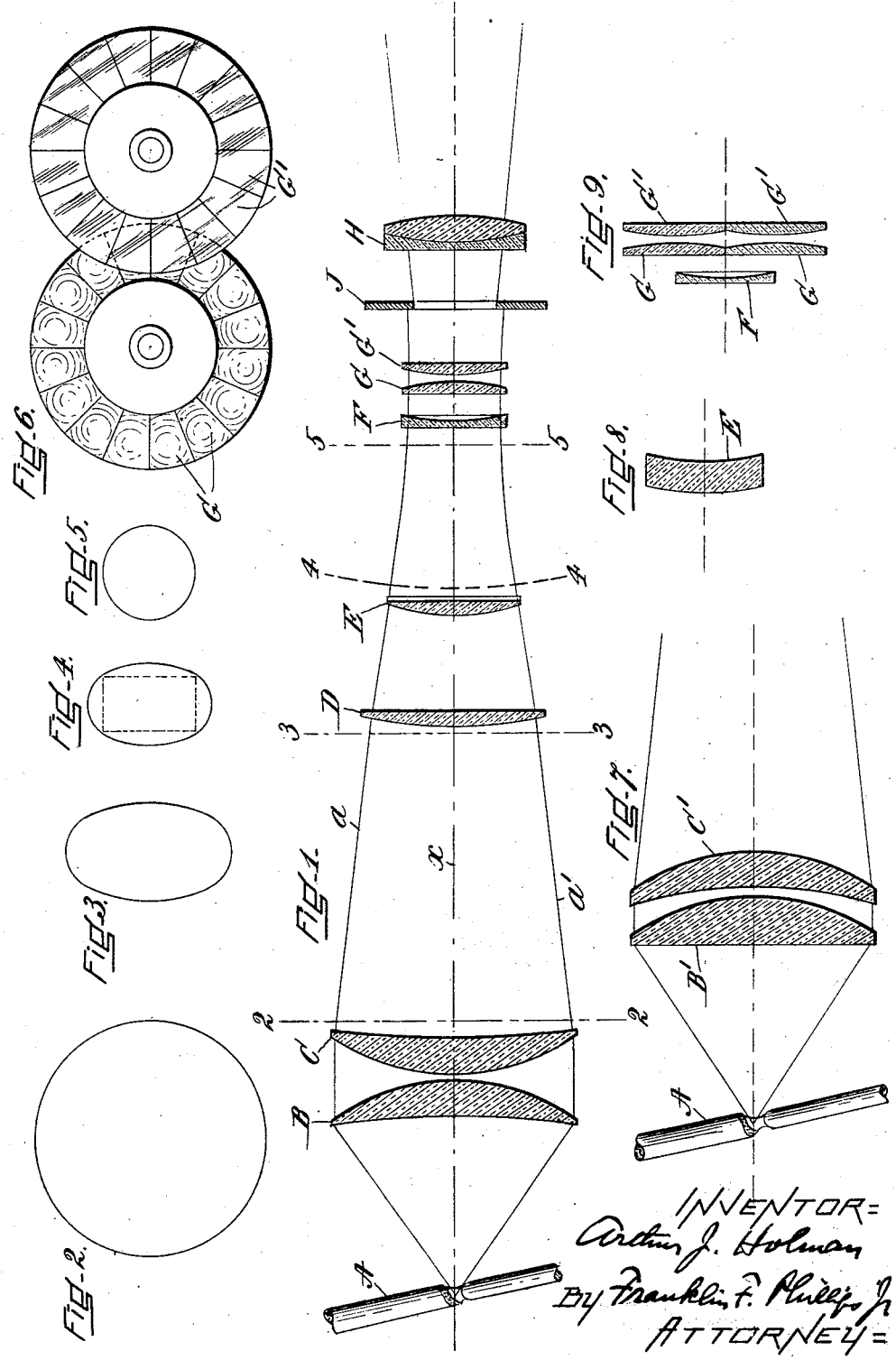
INVENTOR=
Arthur J. Holman
By Franklin F. Phillips Jr
ATTORNEY=

Patented Feb. 15, 1927.

1,617,596

UNITED STATES PATENT OFFICE.

ARTHUR J. HOLMAN, OF BOSTON, MASSACHUSETTS.

OPTICAL SYSTEM FOR MOVING-PICTURE PROJECTORS.

Application filed September 27, 1923. Serial No. 665,204.

My invention relates to that type of projector commonly called the continuous projector in which the effect of movement of the film strip is compensated by moving optical reflecting or refracting elements. It has been the special object of my invention to provide an improved condenser whereby greater illumination of the film strip may be obtained from a source of light of given intensity; also, to provide auxiliary condenser whereby the spherical aberration in the light beam from the main condenser will be reduced and thus produce a more uniform illumination of the film strip; also to provide a sphero-cylindrical lens close to and just behind the film strip which will direct all the light which proceeds through the film strip into the objective system, thereby assuring full and uniform illumination upon the screen; also I have sought to provide for projectors wherein the optical rectifying elements consist of revolving lenses a correcting lens designed to eliminate the periodic variation in equivalent focal length of optical system and also designed to eliminate chromatic aberration in the projected image, thereby eliminating vertical distortion of the image and also eliminating undesirable color fringe.

In continuous projection it is necessary to employ an aperture which is elongated in the vertical plane to accommodate two or more film pictures and hence the spot of light projected upon the film strip must be of sufficient diameter to cover two or more film pictures. This has resulted in a large waste of rays of light in the circular spot of light, upon either side of the film strip. This necessary increase in the diameter of the circular spot of light heretofore employed has resulted in a lower light intensity over the area of the spot and consequently lower screen illumination and has also resulted in a more slowly converging cone of light, the upper and lower portions of which after passing through the top and bottom areas of the aperture, are not sufficiently converged to enter the objective system but spill over above and below and hence are wasted thus producing a periodic intensity flicker upon the screen occasioned by the variation in useful illumination upon the film picture as the picture passes from one extremity of the aperture to the other.

Heretofore attempts have been made to avoid the difficulties above described which result from an enlarged spot of light by producing a spot of light sufficiently large to cover a single picture and employing means, such as a moving reflector, to cause the spot to travel with the film picture being projected on the screen. Such means however involve the use of complicated mechanical moving parts and loss of light from imperfect reflection and have not produced satisfactory results.

I have sought to remedy the difficulties described by simple and effective optical means whereby I have first so shaped the projected light beam as to make the spot of light correspond approximately in shape to the proportions of the elongated aperture without increasing condenser losses and further provided means to reshape the beam of light approximately to circular cross section as it passes through the objective system.

I have found that there exists in that type of projector employing as an element of the objective system movable overlapping optical rectifying members comprising oppositely rotatable discs each provided with a plurality of lenses having their optical centers in a common circle, a periodic variation in the equivalent focal length of such a compound objective system. The equivalent focal length is least when the lenses are all centered on the optical axis and greatest when the revolving lenses are in the operative zone at positions most remote from the optical axis. This variation produces a vertical distortion of the image upon the screen resulting in lack of definition toward the upper and lower margins of the screen image. I have provided an optical element to compensate this variation thereby avoiding the troubles arising therefrom and have made this element of such a quality of glass as to correct the chromatic aberration inherent in the revolving lenses.

My device may be best understood by reference to the accompanying drawings in which—

Fig. 1 shows my improved system in vertical section.

Fig. 2 is a diagrammatic representation of a cross-section of a beam of light on the line 2—2 of Fig. 1.

Fig. 3 is a diagrammatic representation of a cross-section of a beam of light on the line 3—3 of Fig. 1.

Fig. 4 is a diagrammatic representation of a cross-section of a beam of light on the line 4—4 of Fig. 1, which line is that whereon lies the film strip; the dotted rectangle in Fig. 4 indicating the area of the aperture.

Fig. 5 is a diagrammatic representation of a cross-section of a beam of light on the line 5—5 of Fig. 1 showing the beam restored to normal shape as it enters the objective system.

Fig. 6 is a front view of a pair of rotatable optical rectifying elements typical of revolving lens systems comprising overlapping discs.

Fig. 7 shows in vertical section a modified form of the main condenser system as illustrated in Fig. 1.

Fig. 8 is a horizontal cross-section of the lens employed to convert the beam of light from the shape shown in Fig. 4 to the shape shown in Fig. 5.

Fig. 9 is a vertical cross-section showing the rotatable optical rectifying elements with overlying radial edges on the optical axis whereas in Fig. 1 said elements are so positioned that the optical centers of a pair of opposed lenses lie on the optical axis.

Referring now more specifically to the drawings A is a carbon arc constituting a source of light to be projected through the system, the outer rays of the beam of light being indicated by lines $a$ and $a'$. X represents the axis of the system.

The beam of light first encounters a main condenser composed of lenses B and C which are sphero-cylindrical in shape with their convex spherical faces adjacent and the axes of the cylindrical faces horizontal.

The beam of light next encounters a plano-convex lens D beyond which is located a sphero-cylindrical lens E which is positioned with its convex spherical surface facing the source of light. The axis of the concave cylindrical surface of this lens E is vertical.

After passing through the aperture which lies just beyond the lens E on the line 4—4 of Fig. 1 the beam of light encounters a plano-concave lens F, the concave side of which faces the revolving lenses G G' which next influence the beam of light. The beam of light finally encounters the conventional front objective lens H. Between lenses G' and H is interposed a diaphragm J.

It will be readily understood that all lenses above described except the revolving lenses G and G' are suitably mounted in the conventional manner with their centers positioned on the optical axis of the system, and that the rotatable elements are suitably mounted and that means are provided to rotate them.

My device functions in the following manner,—the beam of light passing from the source of light through the main condenser composed of lenses B and C is so influenced thereby that its cross-section, which is approximately circular on the line 2—2 adjacent to these lenses, as shown diagrammatically in Fig. 2, is converted into an elliptical form the major axis of which is in a vertical position so that a cross-section of the beam at the position indicated by the line 3—3 in Fig. 1 is of the shape diagrammatically illustrated in Fig. 3.

The beam next encounters the lens D which is a relatively long focus positive lens which produces a more uniform distribution of illumination by reducing the spherical aberration in the beam of light. The combined influence of the main condenser lenses B and C and the auxiliary condenser D is to produce at the aperture which lies in the position indicated by the line 4—4 of Fig. 1 a brilliantly and uniformly illuminated spot of light which is so condensed as to correspond as nearly as possible to the elongated shape of the aperture necessary for this type of apparatus.

It is obvious that the cross-section of the beam of light must again be modified so that after passing the aperture it may be restored to a shape which is approximately circular so that it will properly pass through the objective system. This modification is produced by the sphero-cylindrical lens E which is approximately zero power in the horizontal plane and has the full converging power of its spherical convex surface in the vertical plane. The result is that the beam of light upon reaching the position shown by line 5—5 of Fig. 1 is again rendered approximately circular in cross-section as illustrated diagrammatically in Fig. 5. It will be noted that my object of securing uniform and concentrated illumination over the film aperture area has been obtained by the interposition of lenses which increase the vertical dimensions of the beam while affecting only in the conventional way the horizontal dimensions thereof.

The beam of light now having been passed through the film pictures and converted again into a form having an approximately circular cross-section, next encounters the plano-concave lens F which performs the function in combination with the revolving elements of producing a periodic variation in the equivalent focal length of this group which compensates the periodic variation in focal length inherent in the conventional group of lenses comprising the revolving elements G G' and the front objective H.

As I have previously stated the equivalent focal length of the revolving elements in conjunction with the front objective is least when these elements are in the relative positions shown in Fig. 1 and greatest when the revolving elements of the group are in the position shown in Fig. 9. It will be observed that, for the position of the lenses F and G G' shown in Fig. 1, the effect of the lens F is to increase the equivalent focal length of this group, since the lens F is a negative lens, and hence counterbalances the reduced focal length which would otherwise be present, at this period of operation in the combination G G' and H. For the position of the revolving elements shown in Fig. 9 it will be observed that the effect of lens F has become that of decreasing the focal length of the combination consisting of F and G G' and thus counterbalancing the increase in focal length which would otherwise have resulted in the combination G G' and H. Thus I have eliminated the cause of image distortion and consequent lack of definition at the top and bottom portions of the screen image which I have found to result from this variation of equivalent focal length in the combination G G' and H.

To correct lenses G and G' for chromatic aberration I have made lens F of flint glass of a suitable index of refraction and dispersive power, whereas lenses G and G' are made of crown glass and could not, because of the nature of their mechanical mountings, well be made achromatic in themselves.

The diaphragm J, located between the revolving system and front objective and placed at the equivalent focal center of the objective system, intercepts the extreme marginal rays which would otherwise produce unfocussed illumination upon the screen.

It will be readily understood by those familiar with the optical art that my improved optical system as shown in Fig. 1 and above described admits the use of some equivalents to produce the new results which I have introduced into such a system. For instance I have shown in Fig. 7 a modified form of main condenser made up of a standard plano-convex lens B' in front of which is located a sphero-cylindrical lens C' having a concave cylindrical surface of double the strength of that of the lens C which surface is placed adjacent the convex surface of the lens B'.

It will also be apparent that the lens F might well be located immediately ahead of revolving lenses G G' instead of behind them, as shown in Fig. 1, with similar results.

It will be further understood that the lens E may be dispensed with in a continuous projector having an optical rectifying system which does not require that the beam of light be circular in cross-section.

By the use of my improvements in a device of the character specified there is obtained a screen image which is brightly and uniformly illuminated, free from flicker resulting from varying intensity of illumination, and which is in all parts sharply focussed so as to show excellent definition throughout.

Having thus fully described my invention what I claim is,—

1. In a device of the character specified the combination of a main condenser comprising two lenses one of which has a surface which is of greater refractive power on one axis than on the other, an objective and optical means for compensating the effect of movement of the film strip.

2. In a device of the character specified the combination of a main condenser comprising two lenses one of which has a cylindrical surface, an objective and optical means for compensating the effect of movement of the film strip.

3. In a device of the character specified the combination of a main condenser comprising two lenses, one of which has a surface which is of greater refractive power on one axis than on the other, an elongated aperture, and a lens adjacent the film position, said lens having one surface which is of greater refractive power on one axis than on the other, the elements of the main condenser being positioned so as to produce an elliptical spot of light substantially corresponding in shape to the proportions of the elongated aperture and the said lens adjacent the film position having its axis of maximum refractive power so positioned as to converge the light passing through the elongated aperture to an approximately circular cross-section at the entrance to the objective system.

4. In a device of the character specified, a pair of oppositely rotatable discs each provided with a plurality of lenses having their optical centers in a common circle, a fixed lens of focal power opposite to that of said lenses in said discs and located in close proximity thereto, said fixed lens being of relatively low refractive power compared to said plurality of lenses and adapted and arranged to produce a slight variation in the equivalent focus of each pair of lenses in said rotatable discs as they pass said fixed lens, and a front objective.

5. In a device of the character specified an objective system comprising a plano-concave lens, adjacent to said lens a pair of oppositely rotatable discs each provided with a plurality of plano-convex lenses having their optical centers in a common circle, and a front objective, said plano-concave lens being of relatively low refractive power compared to said plano-convex lenses, and adapted and arranged to produce a slight variation in the equivalent focus of each pair of said plano-convex lenses as they pass said plano-concave lens.

6. In a device of the character specified, an objective system comprising a pair of oppositely rotatable discs each provided with a plurality of lenses having their optical centers in a common circle, a fixed lens of focal power opposite to that of said lenses in said discs, said focal power being sufficient to neutralize the periodic variation in equivalent focal length inherent in said objective system, the said fixed lens being composed of glass of optical characteristics different from that of said rotatable discs for the purpose of chromatic correction and a front objective.

7. In a device of the character specified the combination of a main condenser comprising two lenses, one of which has a surface which is of greater refractive power on one axis than on the other, an auxiliary plano-convex condenser positioned and ground to reduce the spherical aberration in the light beam projected from said main condenser, an elongated aperture and a lens adjacent the film position, said lens having one surface which is of greater refractive power on one axis than on the other, the elements of the main condenser being positioned so as to produce an elliptical spot of light substantially corresponding in shape to the proportions of the elongated aperture and the said lens adjacent the film position having its axis of maximum refractive power so positioned as to converge the light passing through the elongated aperture to an approximately circular cross-section at the entrance of the objective system.

8. In a device of the character specified the combination of a main condenser comprising two lenses, one of which has a surface which is of greater refractive power on one axis than on the other, an auxiliary plano-convex condenser positioned and ground to reduce the spherical aberration in the light beam projected from said main condenser, an elongated aperture and a lens adjacent the film position, said lens having one surface which is of greater refractive power on one axis than on the other, the elements of the main condenser being positioned so as to produce an elliptical spot of light substantially corresponding in shape to the proportions of the elongated aperture and the said lens adjacent the film position having its axis of maximum refractive power so positioned as to converge the light passing through the elongated aperture to an approximately circular cross-section at the entrance to the objective system, a pair of oppositely rotatable discs each provided with a plurality of lenses having their optical centers in a common circle, a fixed lens of focal power opposite to that of said lenses in said discs and located in close proximity thereto, said fixed lens being of relatively low refractive power compared to said plurality of lenses and adapted and arranged to produce a slight variation in the equivalent focus of each pair of lenses in said rotatable discs as they pass said fixed lens, and a front objective.

In witness whereof I have hereunto affixed my signature.

ARTHUR J. HOLMAN.